United States Patent
Moriya

(10) Patent No.: US 12,135,907 B2
(45) Date of Patent: Nov. 5, 2024

(54) SYSTEM, INFORMATION PROCESSING APPARATUS, PRINTING APPARATUS, CONTROL METHOD, AND NON-TRANSITORY COMPUTER-READABLE STORAGE MEDIUM THAT TRANSMIT A PRINT TARGET BY ROTATING AN IMAGE IN A CASE WHERE AN ACQUIRED CAPABILITY DOES NOT SATISFY A CONDITION

(71) Applicant: CANON KABUSHIKI KAISHA, Tokyo (JP)

(72) Inventor: Takashi Moriya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/351,818

(22) Filed: Jul. 13, 2023

(65) Prior Publication Data
US 2024/0028278 A1    Jan. 25, 2024

(30) Foreign Application Priority Data
Jul. 19, 2022 (JP) ................. 2022-115053

(51) Int. Cl.
*G06F 3/12* (2006.01)

(52) U.S. Cl.
CPC .......... *G06F 3/1251* (2013.01); *G06F 3/1204* (2013.01); *G06F 3/1208* (2013.01); *G06F 3/1254* (2013.01); *G06F 3/1255* (2013.01)

(58) Field of Classification Search
CPC .... G06F 3/1251; G06F 3/1204; G06F 3/1208; G06F 3/1254; G06F 3/1255; G06F 3/1282; G06F 3/1232; G06F 3/1205; G06F 3/1247; G06F 3/1206
See application file for complete search history.

(56) References Cited

U.S. PATENT DOCUMENTS

| | | |
|---|---|---|
| 2013/0201494 A1 | 8/2013 | Sweet |
| 2014/0078539 A1* | 3/2014 | Kakitsuba ............. G06F 3/1256 358/1.13 |
| 2020/0133591 A1* | 4/2020 | Kaneda ................. G06F 3/1232 |

(Continued)

OTHER PUBLICATIONS

The Printer Working Group; IPP Production Printing Extensions v2.0(PPX); Working Draft, Oct. 20, 2021; https://ftp.pwg.org/pub/pwg/ipp/wd/wd-ippppx20-20211020.pdf; pp. 1-61.

*Primary Examiner* — Juan M Guillermety
(74) *Attorney, Agent, or Firm* — Canon U.S.A., Inc. IP Division

(57) ABSTRACT

An information processing apparatus includes at least one processor which functions to acquire information indicating capability of a printing apparatus and control to perform rotation processing for a print target for each layout region on a print medium. The at least one processor functions to control to transmit the print target to the printing apparatus without rotating an image of the print target to be laid out in a first layout region if the capability of the printing apparatus satisfies a predetermined condition based on the acquired information, and transmit the print target to the printing apparatus by rotating the image of the print target to be laid out in the first layout region if the capability of the printing apparatus does not satisfy the predetermined condition based on the acquired information.

37 Claims, 12 Drawing Sheets

(56) References Cited

U.S. PATENT DOCUMENTS

| | | | |
|---|---|---|---|
| 2020/0314254 A1* | 10/2020 | Iwasaki | G06F 3/1208 |
| 2021/0019099 A1* | 1/2021 | Ito | G06F 3/1232 |
| 2021/0200489 A1 | 7/2021 | Takasaki | |
| 2021/0263689 A1 | 8/2021 | Albers | |

* cited by examiner

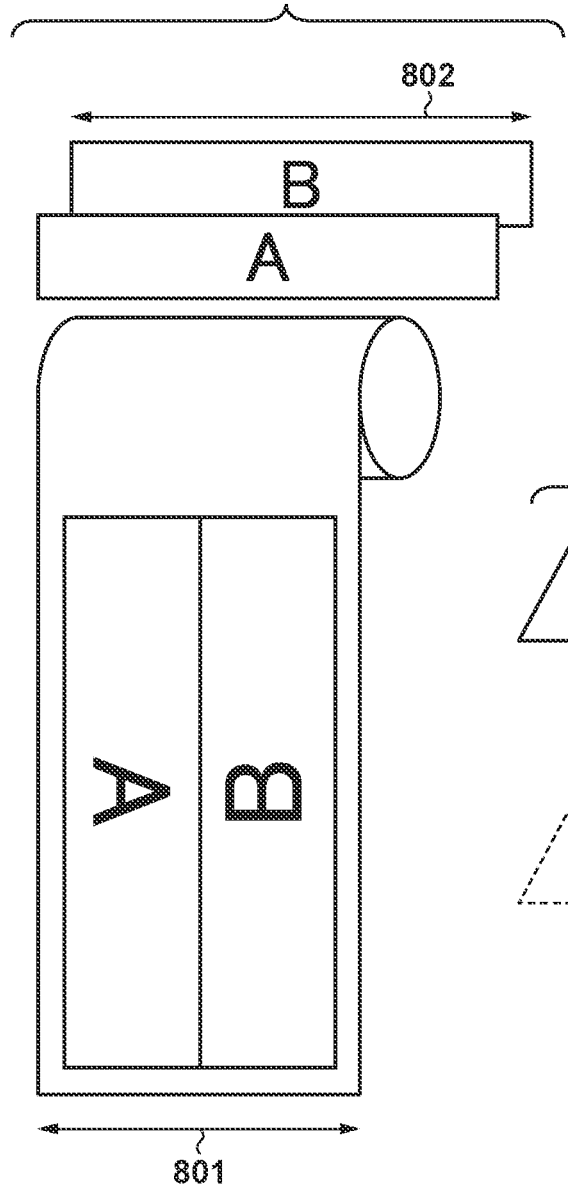
FIG. 8A
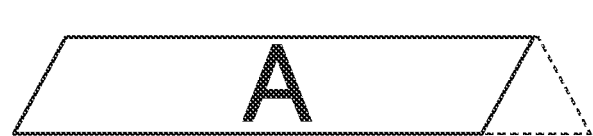
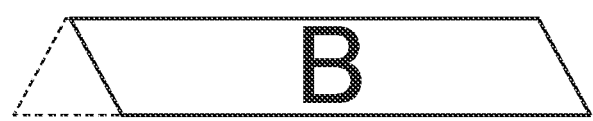
FIG. 8B

FIG. 9A

```
Get-Printer-Attributes:
    attributes-charset = utf-8
    attributes-natural-language = en
    printer-uri = ipp://192.168.114.5:631/ipp/print
    requesting-user-name = user
    requested-attributes = all
```

FIG. 9B

```
status-code = successful-ok
attributes-charset = utf-8
attributes-natural-language = en
document-format-supported = "application/pdf","image/pwg-raster"
media-supported = "iso_a4_210x297mm", "roll_min_203.2x203.2mm",
    "roll_max_917x18000mm"
media-source-supported = "main", "main-roll"
printer-output-tray = "type=removableBin;name=RightOutputBin;
    stackingorder=lastToFirst;pagedelivery=faceUp"
finishings-col-database = { {imposition-template = "banner"},
    {imposition-template = "banner-folding"}}
```

F I G. 10A

```
Validate-Job:
    attributes-charset = utf-8
    attributes-natural-language = en
    printer-uri = ipp://192.168.114.5:631/ipp/print
    requesting-user-name = user
    document-format = application/pdf
    sides (keyword) = one-sided
    finishings-col = {imposition-template = "banner-folding"}
```

F I G. 10B

```
status-code = successful-ok
attributes-charset = utf-8
attributes-natural-language = en
```

FIG. 11A

```
Create-Job:
        attributes-charset = utf-8
        attributes-natural-language = en
        printer-uri = ipp://192.168.114.5:631/ipp/print
        requesting-user-name = user
        document-format = application/pdf
        sides = one-sided
        finishings-col = {imposition-template = "banner-folding"}
```

FIG. 11B

```
        status-code = successful-ok
        attributes-charset = utf-8
        attributes-natural-language = en
```

SYSTEM, INFORMATION PROCESSING APPARATUS, PRINTING APPARATUS, CONTROL METHOD, AND NON-TRANSITORY COMPUTER-READABLE STORAGE MEDIUM THAT TRANSMIT A PRINT TARGET BY ROTATING AN IMAGE IN A CASE WHERE AN ACQUIRED CAPABILITY DOES NOT SATISFY A CONDITION

BACKGROUND

Field of the Disclosure

The present disclosure relates to a system, an information processing apparatus, a printing apparatus, a method, and a non-transitory computer-readable storage medium storing computer-executable instructions.

Description of the Related Art

Conventionally, there is known banner printing using a large-format printer and roll paper. It is known that various performances, such as an advertisement banner in a commercial facility, a tapestry hung on a wall, and a drop curtain, are implemented by executing printing on long roll paper. Banner printing defined in IPP is disclosed in IPP Production Printing Extensions v2.0(PPX) https://ftp.pwg.org/pub/pwg/ipp/wd/wd-ippppx20-20211020.pdf.

SUMMARY

Some embodiments of the present disclosure provide a mechanism for appropriately executing image rotation control in accordance with the capability of a printing apparatus.

The present disclosure in one aspect provides an information processing apparatus comprises at least one memory and at least one processor. The at least one memory and the at least one processor function as an acquisition unit configured to acquire information indicating capability of a printing apparatus; and a control unit configured to control to perform rotation processing for a print target for each layout region on a print medium, and to control to transmit the print target to the printing apparatus without rotating an image of the print target to be laid out in a first layout region in a case where the capability of the printing apparatus satisfies a predetermined condition based on the information acquired by the acquisition unit, and transmit the print target to the printing apparatus by rotating the image of the print target to be laid out in the first layout region in a case where the capability of the printing apparatus does not satisfy the predetermined condition based on the information acquired by the acquisition unit.

According some embodiments, it is possible to appropriately execute image rotation control in accordance with the capability of a printing apparatus.

Further features of various embodiments will become apparent from the following description of exemplary embodiments with reference to the attached drawings.

BRIEF DESCRIPTION OF THE DRAWINGS

FIGS. 8A and 8B are views showing a print result;

FIGS. 9A and 9B are views showing contents of a printer information acquisition request and response;

FIGS. 10A and 10B are views showing contents of a print job verification request and response;

FIGS. 11A and 11B are views showing contents of a print job request and response.

DESCRIPTION OF THE EMBODIMENTS

Figure 1:
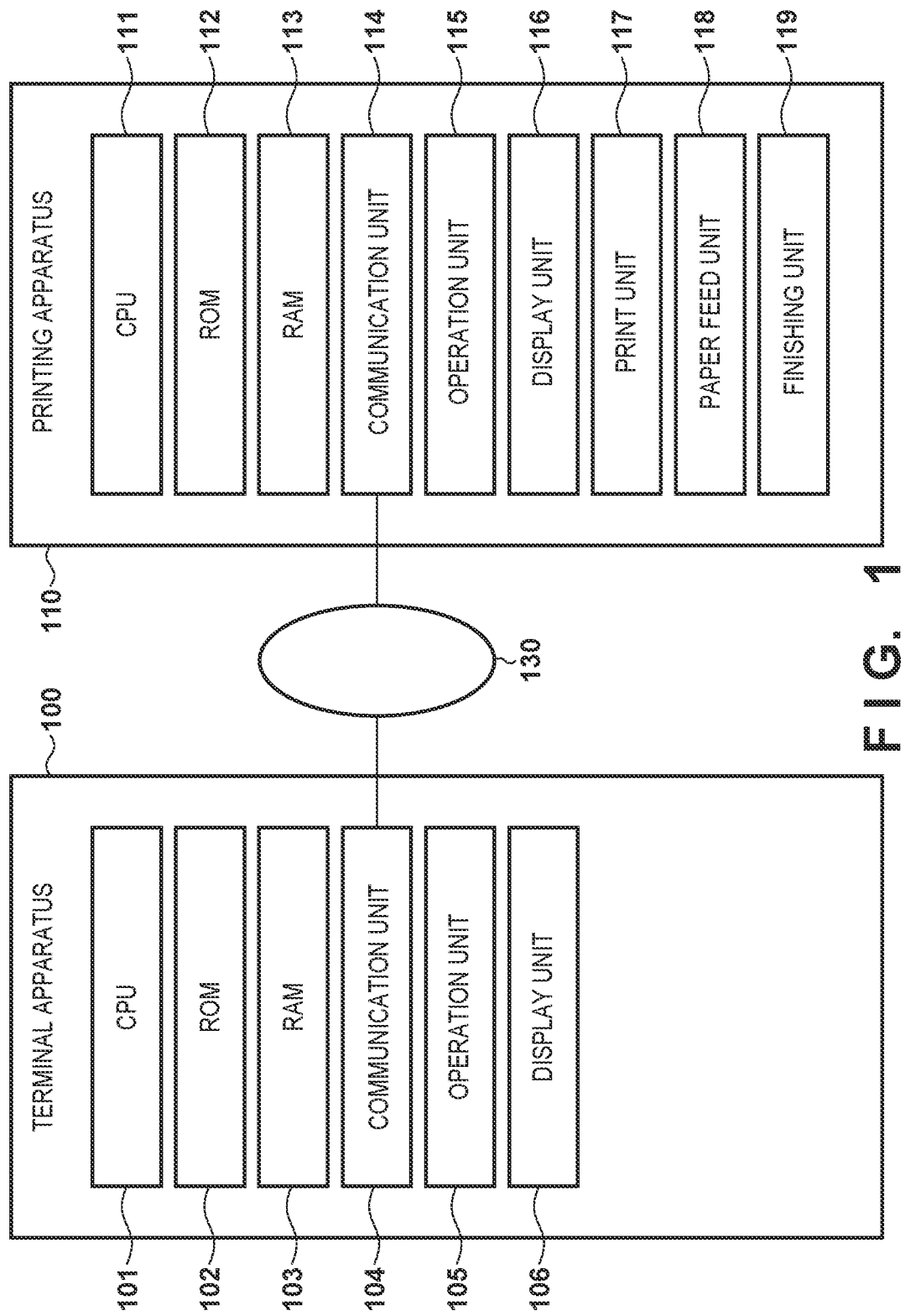
FIG. 1 is a view showing the configuration of a printing system.

Hereinafter, embodiments will be described in detail with reference to the attached drawings. Note, the following embodiments are not intended to limit the scope of every embodiment. Multiple features are described in the embodiments, but limitation is not made to embodiments that require all such features, and multiple such features may be combined as appropriate. Furthermore, in the attached drawings, the same reference numerals are given to the same or similar configurations, and redundant description thereof is omitted.

In banner printing using roll paper, in a case where a banner is hung from a ceiling, it is necessary to be able to visually perceive the banner from both sides of paper surfaces. To output such a printed product, it is necessary to appropriately execute image rotation control in accordance with the capacity of a printing apparatus.

According to the present disclosure, it is possible to appropriately execute image rotation control in accordance with the capacity of a printing apparatus.

First Embodiment

FIG. 1 is a view showing an example of the configuration of a printing system including a terminal apparatus 100 and a printing apparatus 110 according to this embodiment. The terminal apparatus 100 is an information apparatus used by a user, and is, for example, a smartphone or a Personal Computer (PC). The terminal apparatus 100 includes a CPU 101, a ROM 102, a RAM 103, a communication unit 104, an operation unit 105, and a display unit 106. The CPU 101 is a central processing unit, and executes a program stored in the ROM 102 to comprehensively control the terminal apparatus 100. The ROM 102 is a nonvolatile memory, and stores an operating system, an application program (to be referred to as an application hereinafter), and data, such as a document.

In this embodiment, the ROM 102 can perform communication by a standard protocol called Internet Printing Protocol (IPP), and stores a driver (to be referred to as a standard driver hereinafter) that can transmit a print job to the printing apparatus 110. A more specifically, the standard driver is, for example, the IPP Class Driver for the Mopria standard on Windows®. Also, the standard driver may be, for example, a driver for the Air Print function mounted on iOS®. The standard driver may be packaged with an OS at the time of arrival of the terminal apparatus 100 and installed on the terminal apparatus 100 in advance, or may be downloaded from a store application or the like and installed on the terminal apparatus 100. The standard driver is not a printer driver provided by the vendor of the printing apparatus 110 for each model of the printing apparatus 110. The standard driver can commonly be used for a plurality of printing apparatuses of a plurality of vendors, and is a standard driver provided by the vendor of the OS.

The RAM 103 is a volatile memory, and the CPU 101 deploys an execution program from the ROM 102 into the RAM 103 and executes it. For example, the operation of the terminal apparatus 100 according to this embodiment is implemented when the CPU 101 deploys the execution program from the ROM 102 into the RAM 103 and executes it. The communication unit 104 is a wired LAN module or a wireless LAN module, and can communicate with a communication unit 114 of the printing apparatus 110 via a network 130. Note that the network 130 includes a wired network, a wireless network, and a combination thereof. The operation unit 105 includes a keyboard and a mouse or a touch panel, and can accept a user operation. Operation information accepted by the operation unit 105 is sent to the CPU 101. The display unit 106 is, for example, a liquid crystal display device, and displays a Graphical User Interface (GUI). Note that the components of the terminal apparatus 100 are not limited to those shown in FIG. 1, and another component may appropriately be included in accordance with a function executable by the terminal apparatus 100.

The printing apparatus 110 includes a CPU 111, a ROM 112, a RAM 113, the communication unit 114, an operation unit 115, a display unit 116, a print unit 117, a paper feed unit 118, and a finishing unit 119. The CPU 111 is a central processing unit, and executes a program stored in the ROM 112 to comprehensively control the printing apparatus 110. The ROM 112 is a nonvolatile memory, and stores a control program for controlling the printing apparatus 110. The RAM 113 is a volatile memory, and the CPU 111 deploys an execution program from the ROM 112 into the RAM 113 and executes it. For example, the operation of the printing apparatus 110 according to this embodiment is implemented when the CPU 111 deploys the execution program from the ROM 112 into the RAM 113 and executes it. The communication unit 114 is a wired LAN module or a wireless LAN module, and can communicate with the communication unit 104 of the terminal apparatus 100 via the network 130. The operation unit 115 is formed from a touch panel and buttons, and can accept a user operation. Operation information accepted by the operation unit 115 is sent to the CPU 111. The display unit 116 is, for example, a liquid crystal display device, and displays a user interface screen.

The print unit 117 includes a printhead adopting an inkjet printing method of discharging ink droplets, and an ink supply unit that supplies ink to the printhead, and forms an image on the surface of a print medium, such as cut paper or roll paper (long print medium), fed from the paper feed unit 118. The paper feed unit 118 can feed cut paper or roll paper, and feeds a print medium to the print unit 117 in accordance with an instruction from the CPU 111. In accordance with an instruction from the CPU 111, the finishing unit 119 executes finishing processing for the print medium printed by the print unit 117. The finishing unit 119 includes a stapler that staples each set with a staple or the like, a cutter that cuts roll paper at a designated position, and a laminator that laminates the print medium. The processing by the finishing unit 119 includes processing of applying special transparent ink to give the result a glossy feeling or improve weatherability.

Note that the components of the printing apparatus 110 are not limited to those shown in FIG. 1, and another component may appropriately be included in accordance with a function executable by the printing apparatus 110. In this embodiment, the printing apparatus 110 is described as a printing apparatus adopting the inkjet printing method but may be a printing apparatus adopting another printing method such as an electrophotographic method.

Figure 2A:
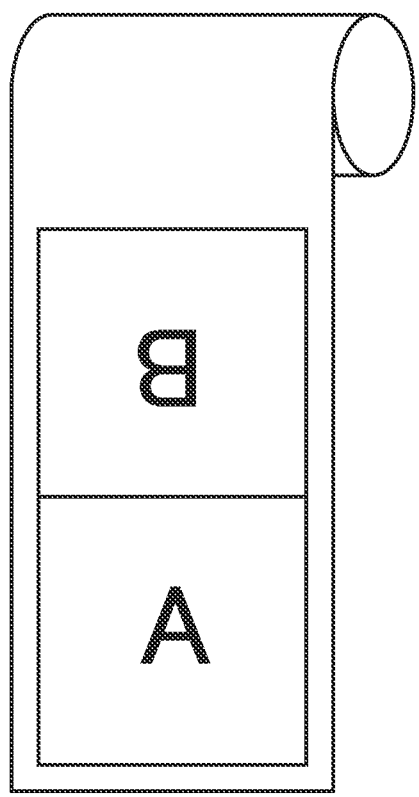
FIGS. 2A and 2B are views showing a print result.
Figure 2B:
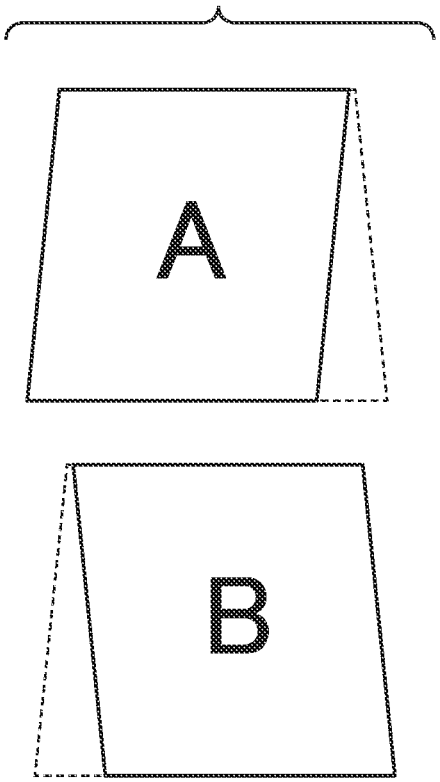

FIGS. 2A and 2B are views showing an example of a print result printed by the printing apparatus 110. FIG. 2A shows an example of a result of printing image data transmitted from the terminal apparatus 100 on roll paper by the printing apparatus 110. As shown in FIG. 2A, an image A and an image B are printed so that the upper ends of the images face each other. FIG. 2B shows a state in which one paper sheet is folded and seen from two sides. The user mountain-folds the printed roll paper at an intermediate point as the boundary between the images A and B. As a result, as shown in the upper portion of FIG. 2B, the image A is displayed at a correct position by setting the folded portion on the upside like the front paper surface. If the paper is reversed, the image B is displayed at a correct position by setting the folded portion on the upside, as shown in the lower portion of FIG. 2B.

It is generally known that a hanging banner is used for advertisement in a commercial facility, a store, or the like. In a case where the paper sheet in the state shown in FIG. 2B is hung from a ceiling or the like, the images A and B can be visually perceived from both the sides. To output a printed product as a hanging banner shown in FIG. 2B, a folding printing function is used. To implement folding double-sided printing, it is necessary to print on one surface of the roll paper by performing rotation by 180° from the correct position, like the image A shown in FIG. 2A. If images to undergo folding double-sided printing are laid out on the roll paper, one of the images is rotated from the correct position by 180° so that the upper ends of the two images face each other, as shown in FIG. 2A. FIG. 2A shows a result of printing the two images so that the upper ends of the two images face each other. In this embodiment, image rotation control is executed by one of the terminal apparatus 100 and the printing apparatus 110, as will be described later. If the terminal apparatus 100 executes image rotation control, the image data transmitted to the printing apparatus 110 is data obtained by rotating the image A by 180°, similar to FIG. 2A. On the other hand, if the printing apparatus 110 executes image rotation control, the image data transmitted to the printing apparatus 110 is such data that the upper ends of the images A and B face downward, with reference to FIG. 2A. Note that the images A and B are used for the sake of description but the images A and B may be processed as two pages laid out on the roll paper. Note that layout printing indicates a form of executing printing by laying out a plurality of images on one print medium. This embodiment describes a form of executing printing by laying out a plurality of images on one roll paper, but control of this embodiment may be executed in a form of executing printing by laying out a plurality of images on one cut paper or standard paper.

Note that when executing printing so that the upper ends of the two images face each other, the upper ends of the images A and B coincide with each other in FIG. 2A but a binding margin may be provided to the folding line of folding double-sided printing. The width of the binding margin may be settable by the operation unit 105 of the terminal apparatus 100 or the operation unit 115 of the printing apparatus 110.

In this embodiment, the terminal apparatus 100 acquires capability information of the printing apparatus 110 from the printing apparatus 110 before transmitting a print start instruction to the printing apparatus 110. Then, based on the capability information of the printing apparatus 110, the terminal apparatus 100 determines which of the printing apparatus 110 and the terminal apparatus 100 executes image rotation control when printing the hanging banner shown in FIGS. 2A and 2B. The determination processing executed by the terminal apparatus 100 will be described below with reference to FIG. 3. In this embodiment, printing of a hanging banner by roll paper is executed using the folding double-sided printing function of the printing apparatus 110. Note that in executing folding double-sided printing, the printing apparatus 110 need not include a hardware mechanism for folding and cutting the roll paper so that the paper surface provides two surfaces, as finishing processing of the roll paper. That is, after the printing apparatus 110 cuts the roll paper as finishing processing, the user folds the paper at the intermediate position between the front and back pages on the paper surface, thereby obtaining the printed product shown in FIG. 2B. Therefore, in this embodiment, in a case where folding double-sided printing is executed, the printing apparatus 110 discharges the paper as single-sided printing.

Figure 3:
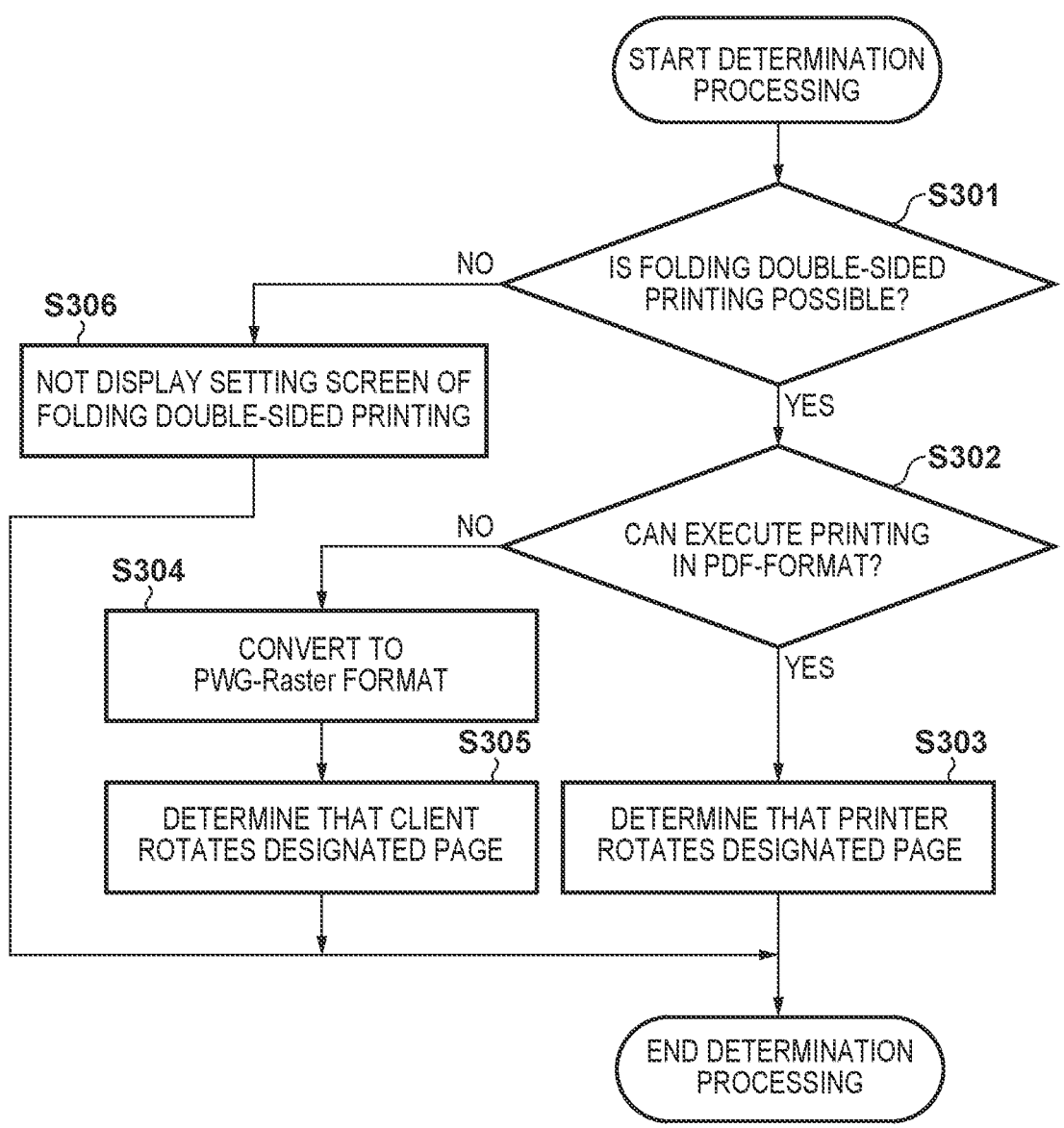
FIG. 3 is a flowchart illustrating determination processing executed by a terminal apparatus.

FIG. 3 is a flowchart illustrating the determination processing executed by the terminal apparatus 100. The processing shown in FIG. 3 is implemented when, for example, the CPU 101 of the terminal apparatus 100 reads out the program (more specifically, the standard driver) stored in the ROM 102 into the RAM 103 and executes the program. That is, in this embodiment, the processing shown in FIG. 3 is processing executed by the standard driver.

Before the start of the processing shown in FIG. 3, the terminal apparatus 100 acquires the capability information of the printing apparatus 110 from the printing apparatus 110 by the standard driver. In this embodiment, the terminal apparatus 100 acquires the capability information of the printing apparatus 110 from the printing apparatus 110 by a Get-Printer-Attributes operation in IPP. The Get-Printer-Attributes operation is defined in IPP as an operation that can request the printing apparatus 110 to transmit various attributes of the printing apparatus 110.

In step S301, the CPU 101 determines whether the printing apparatus 110 has capability of executing folding double-sided printing. In step S301, more specifically, for example, the CPU 101 transmits a Get-Printer-Attributes request to the printing apparatus 110. Based on information included in a Get-Printer-Attributes response from the printing apparatus 110, the CPU 101 determines whether the printing apparatus 110 supports folding double-sided printing.

FIG. 9A is a view showing an example of the Get-Printer-Attributes request as a printer information acquisition request transmitted by the terminal apparatus 100. An IPP attribute value to be acquired from the printing apparatus 110 is designated in a requested-attributes attribute included in the request.

FIG. 9B is a view showing an example of the Get-Printer-Attributes response indicating a normal response from the printing apparatus 110. As shown in FIG. 9B, application/pdf and image/pwg-raster are designated as the capability information of the printing apparatus 110 in a document-format-supported attribute. In a media-source-supported attribute, main-roll, that is, capability information concerning feeding of roll paper is designated. In a printer-output-tray attribute, pagedelivery=faceUp is designated as a discharge direction of a print page. An imposition-template attribute is included as capability information concerning layout in a finishings-col-database attribute. In FIG. 9B, banner and banner-folding are designated in the imposition-template attribute. The imposition-template attribute indicating the folding double-sided printing capability can be included in the finishings-col-database attribute or a finishings-col-ready attribute.

With respect to banner printing, the CPU 101 performs determination based on whether banner is designated in the imposition-template attribute. With respect to folding double-sided printing, the CPU 101 performs determination based on whether banner-folding is designated in the imposition-template attribute. Note that banner-folding is a parameter defined in the imposition-template attribute to indicate the folding double-sided printing capability. However, as long as a single parameter or a combination of a plurality of parameters is defined to indicate the folding double-sided printing capability, it is not limited to the imposition-template attribute. Another IPP attribute, such as the finishings-col-ready attribute, may be used.

If banner-folding is not designated, it is determined that the printing apparatus 110 has no capability of executing folding double-sided printing, and the process advances to step S306. In this case, the CPU 101 controls not to display a folding double-sided printing setting screen on the display unit 106. After step S306, the processing shown in FIG. 3 ends. With this arrangement, it is possible to execute display control of the setting screen in accordance with the capability of the printing apparatus 110. On the other hand, if banner-folding is designated, the CPU 101 determines that the printing apparatus 110 has capability of executing folding double-sided printing, and displays the folding double-sided printing setting screen on the display unit 106. In the setting screen, an item that can accept, from the user, an instruction of switching enabling/disabling of folding double-sided printing is provided.

If it is determined that the printing apparatus 110 has capability of executing folding double-sided printing and folding double-sided printing is enabled on the setting screen, it is determined, in step S302 and subsequent steps, which of the terminal apparatus 100 and the printing apparatus 110 executes image rotation control.

In step S302, the CPU 101 determines whether the printing apparatus 110 can execute printing in a predetermined data format. More specifically, for example, the CPU 101 refers to the document-format-supported attribute of the Get-Printer-Attributes response from the printing apparatus 110. Then, based on the value of the attribute, the CPU 101 determines whether it is possible to execute printing in Portable Document Format (PDF). If the application/pdf value is designated, the CPU 101 determines that the printing apparatus 110 can execute printing in the PDF format. If the printing apparatus 110 can execute printing in the PDF format, the CPU 101 determines that the printing apparatus 110 can execute image rotation control. The use of the document-format-supported attribute for determination is an example, and another attribute may be used. For example, another IPP attribute concerning image rotation control may be used. The printing apparatus 110 confirms a document-format attribute at the time of receiving a Create-Job-Request to be described later, and recognizes which of the terminal apparatus 100 and the printing apparatus 110 is the execution constituent of image rotation control.

If it is determined in step S302 that the printing apparatus 110 can execute printing in the PDF format, the CPU 101 determines in step S303 that the printing apparatus 110 executes image rotation control. In other words, the CPU 101 determines that no image rotation control is executed by the standard driver. Furthermore, the CPU 101 determines to transmit image data in the PDF format to the printing apparatus 110. Thus, for example, if printing is executed on the roll paper in the direction of the image A shown in FIG. 2A, the printing apparatus 110 executes rotation control, by 180°, for the image of the first page (front surface) among the plurality of pages of the image data. Note that FIG. 2A shows a case where the plurality of pages are transmitted to the printing apparatus 110 in ascending order. However, the user can intentionally change the transmission order to a descending order by a print setting in the terminal apparatus 100. In this embodiment, the printing apparatus 110 executes rotation control for the image of the page that is closer to the leading edge of the roll paper and is to be printed first, regardless of the printing setting of the ascending order or descending order on the side of the terminal apparatus 100. If the CPU 101 displays the folding double-sided printing setting screen on the display unit 106, and accepts a print start instruction on the setting screen, the CPU 101 ends the processing shown in FIG. 3 without executing image rotation control, and then executes processes in S504 and subsequent steps of FIG. 5.

If it is determined in step S302 that the printing apparatus 110 cannot execute printing in the PDF format, the CPU 101 converts, in step S304, the current image data into image data described in a Page Description Language (PDL) other than PDF. In IPP, in addition to PDF, PWG-Raster and PCLm can be used as a PDL of a raster format. In this embodiment, in a case where the image data is transmitted in PWG-Raster or PCLm to the printing apparatus 110, the terminal apparatus 100 executes image rotation control, and the printing apparatus 110 executes no image rotation control. In this embodiment, as an example, a case where the image data is converted into PWG-Raster in step S304 will be described.

In a case of a raster format like PWG-Raster, the image data is transmitted to the printing apparatus 110 on a band basis, and the printing apparatus 110 sequentially prints the data. Thus, it is not easy for the printing apparatus 110 to execute rotation control for the image of the transmitted page. Therefore, the terminal apparatus 100 executes rotation control for the image of a specific page in folding double-sided printing. For example, which of two pages corresponding to front and back surfaces in folding double-sided printing is rotated by 180° needs to be changed in accordance with whether the pages are transmitted in ascending order (order of the first page and the second page) or descending order (order of the second page and the first page). Therefore, the CPU 101 confirms the value of the pagedelivery attribute of the printer-output-tray attribute as the capability information acquired from the printing apparatus 110. In a case of, for example, Pagedelivery=face-down, the image data is transmitted in ascending order.

Figure 5:
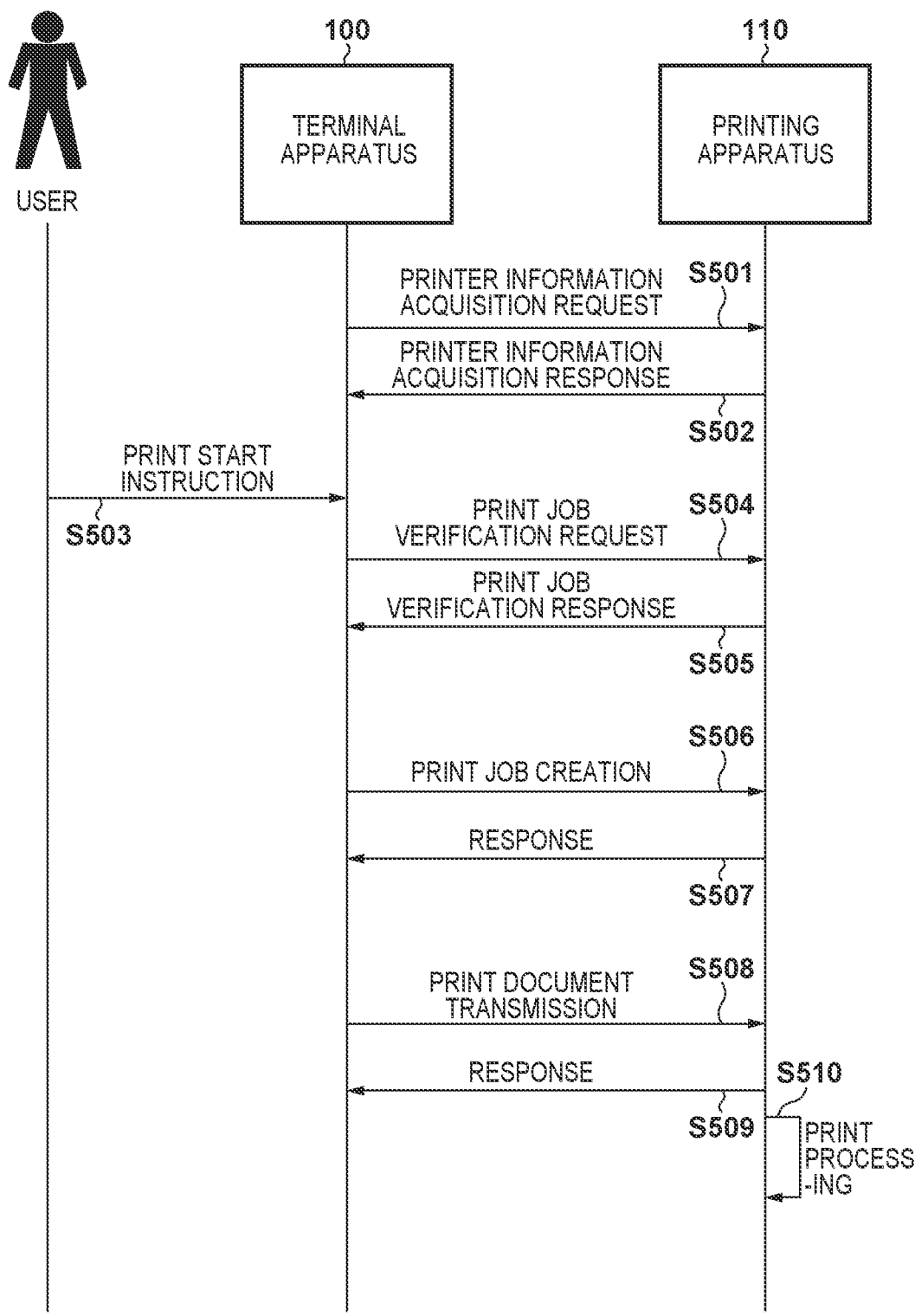
FIG. 5 is a sequence chart showing a communication sequence between apparatuses of the printing system.

In step S305, the CPU 101 determines that the terminal apparatus 100 executes image rotation control. The CPU 101 determines to execute image rotation control by the standard driver. Then, if the CPU 101 displays the folding double-sided printing setting screen on the display unit 106, and accepts a print start instruction on the setting screen, the CPU 101 executes image rotation control for a specific page of the image data converted in step S304. For example, if the image data is transmitted in ascending order, the CPU 101 rotates the image of an odd-numbered page (first page) by 180°. If the image data is transmitted in descending order, the CPU 101 rotates the image of an even-numbered page (second page) by 180°. That is, in either case, the CPU 101 rotates the image that is closer to the leading edge of the roll paper and is to be printed first in the printing apparatus 110. After step S305, the processing shown in FIG. 3 ends, and processes in S504 and subsequent steps of FIG. 5 are executed.

Figure 4:
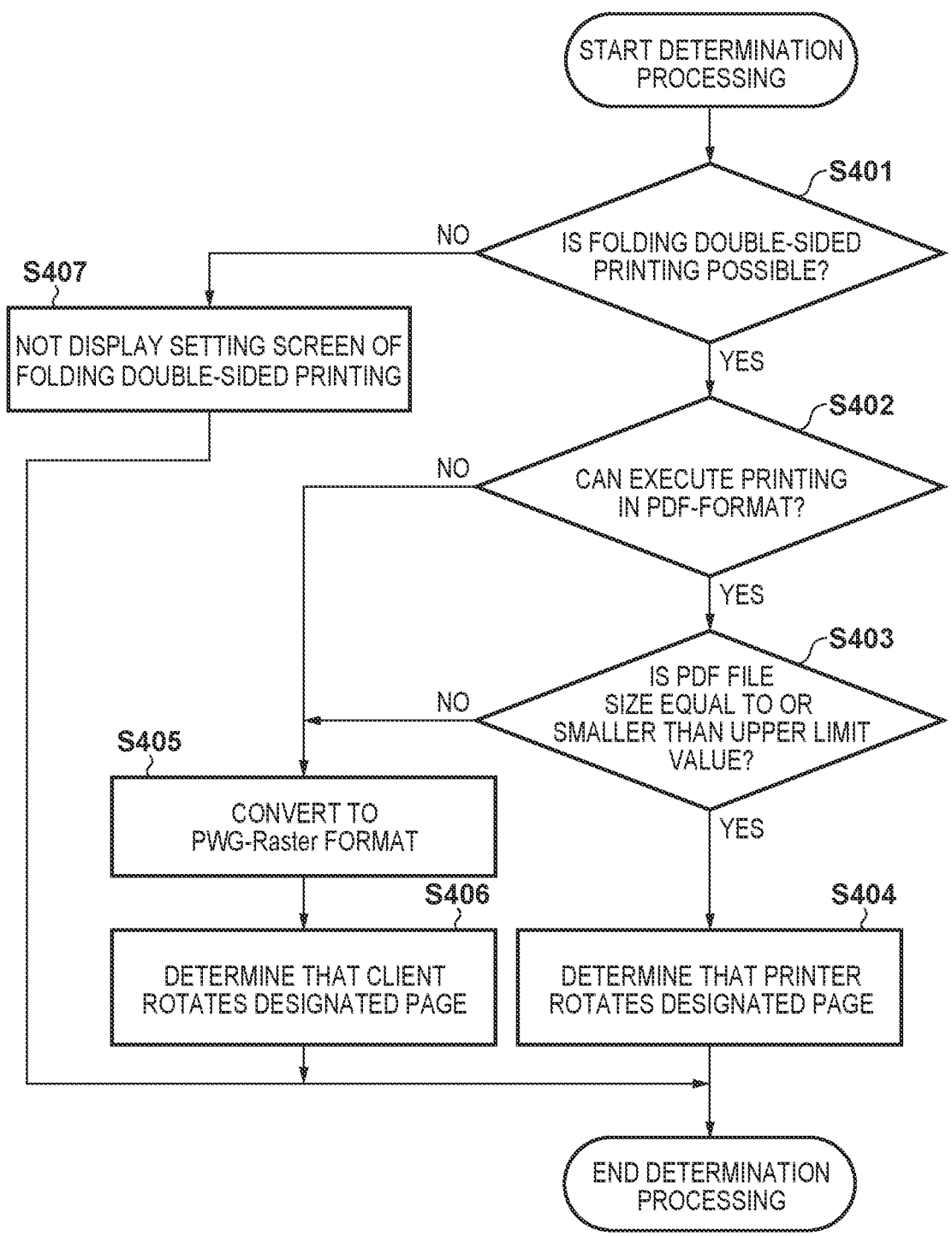
FIG. 4 is a flowchart illustrating determination processing executed by the terminal apparatus.

FIG. 4 is a flowchart illustrating another example of the determination processing executed by the terminal apparatus 100. The processing shown in FIG. 4 is implemented when, for example, the CPU 101 of the terminal apparatus 100 reads out the program (more specifically, the standard driver) stored in the ROM 102 into the RAM 103 and executes the program. That is, in this embodiment, the processing shown in FIG. 4 is processing executed by the standard driver.

Processes in steps S401, S402, S405, S406, and S407 are the same as those in steps S301, S302, S304, S305, and S306 of FIG. 3 and a description thereof will be omitted.

If it is determined in step S402 that the printing apparatus 110 can execute printing in the PDF format, the CPU 101 determines in step S403 whether the size of the image data satisfies a predetermined condition. That is, it is determined in step S403 whether the size of the image data exceeds the upper limit value of the data size of a PDF file processible by the printing apparatus 110. The upper limit value may be, for example, a value based on the upper limit capacity of the buffer memory of the printing apparatus 110. The CPU 101 refers to a pdf-k-octets-supported (not shown) attribute included in the Get-Printer-Attributes response from the printing apparatus 110. Then, the CPU 101 acquires the upper limit value of the data size of the PDF file processible by the printing apparatus 110 based on the value of the attribute, and executes the determination processing in step S403.

If it is determined in step S403 that the size of the image data does not exceed the acquired upper limit value, that is, the size of the image data is equal to or smaller than the upper limit value, the process advances to step S404. Processing in step S404 is the same as that in step S303 of FIG. 3 and a description thereof will be omitted.

On the other hand, if it is determined in step S403 that the size of the image data exceeds the acquired upper limit value, the process advances to step S405, and the image data is converted into image data described in a Page Description Language (PDL) other than PDF, for example, the PWG-Raster format.

That is, according to the processing shown in FIG. 4, if the size of the image data exceeds the upper limit value of the data size of the PDF file processible by the printing apparatus 110, the terminal apparatus 100 executes image rotation control.

Note that in the above description, the determination processing in step S302 or S403 is executed as determination processing for determining which of the printing apparatus 110 and the terminal apparatus 100 executes image rotation control, but some embodiments are not limited to this. Another determination processing may be executed instead of or in addition to the determination processing in step S302 or S403. More specifically, the other determination processing is, for example, determination of whether the printing apparatus 110 requests to transmit the image data in the PDF format or in the raster format. If the printing apparatus 110 requests to transmit the image data in the PDF format, the CPU 101 advances to step S304. If the printing apparatus 110 requests to transmit the image data in the raster format, the CPU 101 advances to step S303. The determination processing is performed based on the capability information of the printing apparatus 110 acquired from the printing apparatus 110 before the determination processing. That is, in this form, even if the printing apparatus 110 supports both the PDF format and the raster format, data reception in a specific format to be prioritized can be preset. Then, by including the setting contents in the capability information of the printing apparatus 110, the printing apparatus 110 can request the format of the image data to be transmitted.

FIG. 5 is a sequence chart showing a communication sequence between the apparatuses of the printing system according to this embodiment. In FIG. 5, the processing of the terminal apparatus 100 is executed by the CPU 101, and the processing of the printing apparatus 110 is executed by the CPU 111. The processing shown in FIG. 5 is started when, for example, the printing apparatus 110 connected to the network 130 is registered in the terminal apparatus 100. Note that in FIG. 5, the processing of the terminal apparatus 100 is executed by the standard driver.

In S501, the terminal apparatus 100 requests, via the communication unit 104, the printing apparatus 110 to acquire the printer attributes. As described above, the acquisition request of the printer attributes is defined as a Get-Printer-Attributes operation in IPP, and it is possible to request the printing apparatus 110 to transmit various attributes of the printing apparatus 110.

Upon receiving a Get-Printer-Attributes request, the printing apparatus 110 transmits, in S502, a Get-Printer-Attributes response in which attributes are designated in accordance with the capability of the printing apparatus 110. The attributes included in the Get-Printer-Attributes response are, for example, a paper size supported by the printing apparatus 110, its default value, a paper type, and its default value. For example, the attributes include possibility of double-sided printing, a type of finishing processing executable by the printing apparatus 110, its default value, a type of an ink tank provided in the printing apparatus 110, and its remaining amount. The above-described imposition-template attribute concerning folding double-sided printing is included in the finishings-col-database attribute or the finishings-col-ready attribute.

After S501 and S502, the terminal apparatus 100 executes the processing shown in FIG. 3 or 4 to determine which of the terminal apparatus 100 or the printing apparatus 110 executes image rotation control. If a determination result other than step S306 of FIG. 3 and step S407 of FIG. 4 is obtained, the terminal apparatus 100 displays, on the display unit 106, the setting screen for setting folding double-sided printing. Note that the user can designate enabling/disable of folding double-sided printing on the setting screen.

In S503, the user confirms the contents of the print setting on the setting screen displayed on the display unit 106, and issues a print start instruction. Upon accepting the print start instruction, the terminal apparatus 100 transmits, in S504, a Validate-Job-Request as a print job verification request to the printing apparatus 110. Upon receiving the Validate-Job-Request, the printing apparatus 110 verifies the print setting value and sends a verification result as a response in S505. FIG. 10A is a view showing an example of the Validate-Job-Request as the print job verification request transmitted by the terminal apparatus 100. FIG. 10B is a view showing an example of a Validate-Job-Response indicating a normal response from the printing apparatus 110.

In S504, the CPU 101 refers to the imposition-template attribute acquired by the Get-Printer-Attributes request. Then, the CPU 101 designates, in a finishings-col attribute of the Validate-Job-Request, the value of banner-folding of the imposition-template attribute which has previously been referred to. Note that in this embodiment, as described above, in folding double-sided printing, the printing apparatus 110 discharges the paper as single-sided printing. Therefore, one-sided (single-sided printing) is designated in a sides attribute. In FIG. 10A, application/pdf is designated in the document-format attribute.

In S505, based on the combination of the parameters designated in the Validate-Job-Request, the printing apparatus 110 determines whether the verification result indicates a normal state or an error state. In this example, the Validate-Job-Response indicating a normal response, as shown in FIG. 10B, is transmitted. A case where an error response is indicated will be described later with reference to FIG. 6.

Upon receiving the verification result indicating a normal state, the terminal apparatus 100 creates, in S506, a print job printable by the printing apparatus 110 in accordance with the verification result and the determination result in FIG. 3 or 4. More specifically, for example, if it is determined that the printing apparatus 110 executes image rotation control, a print job is generated to include the image data in the PDF format which has not undergone rotation control by the standard driver. In this case, the print job may include information for instructing the printing apparatus 110 to execute image rotation control. Furthermore, if it is determined that the terminal apparatus 100 executes image rotation control, a print job is generated to include the image data in the raster format having undergone rotation control by the standard driver. Then, the terminal apparatus 100 transmits the generated print job to the printing apparatus 110. More specifically, for example, the terminal apparatus 100 transmits a Create-Job-Request to the printing apparatus 110. Upon receiving the Create-Job-Request, the printing apparatus 110 generates a job object and transmits a Create-Job-Response to the terminal apparatus 100 in S507.

FIG. 11A is a view showing an example of the Create-Job-Request as the print job request transmitted by the terminal apparatus 100. FIG. 11B is a view showing an example of the Create-Job-Response from the printing apparatus 110. In FIG. 5, since the normal response is obtained in response to the print job verification request, the same parameters as those designated in the Validate-Job-Request are designated in the IPP attributes of the Create-Job-Request.

Upon receiving the Create-Job-Response, the terminal apparatus 100 transmits a document to the printing apparatus 110 in S508. More specifically, for example, the terminal apparatus 100 transmits a Send-Document-Request to the printing apparatus 110. Upon receiving the Send-Document-Request, the printing apparatus 110 transmits a Send-Document-Response to the terminal apparatus 100 in S509. Then, in S510, the printing apparatus 110 executes print processing of the document included in the Send-Document-Request. The document is image data to undergo folding double-sided printing.

In the print processing in S510, the printing apparatus 110 executes folding double-sided printing as part of finishing processing in accordance with the value of the imposition-template attribute designated in the finishings-col attribute of the Create-Job-Request. As described above, assume that there is no hardware mechanism for folding and cutting the roll paper so that the paper surface provides two surfaces, as finishing processing of the roll paper in the printing apparatus 110. In this embodiment, after the printing apparatus 110 cuts the roll paper as finishing processing, the user folds the paper at the intermediate position between the front and back pages on the paper surface.

Furthermore, in the print processing, the printing apparatus 110 determines, based on the document-format attribute of the Create-Job-Request, whether to execute image rotation control. For example, if application/pdf is designated in the document-format attribute, it is determined to execute image rotation control. For example, if pwg-raster is designated in the document-format attribute, the terminal apparatus 100 has already executed image rotation control, and it is thus determined not to execute image rotation control. If it is determined to execute image rotation control, the printing apparatus 110 executes rotation control for the image of a specific page of the image data. More specifically, rotation control is executed for the image of a page that is closer to the leading edge of the roll paper and is to be printed first, and the rotated image is laid out in a print region, thereby executing printing.

The example of transmitting the Validate-Job-Request and receiving the Validate-Job-Response indicating a normal response has been described with reference to FIG. 5. However, even if the capability information of the printing apparatus 110 is acquired in advance, and pdf is designated in the parameter set of the print job, the result of the print job verification request may be an error depending on a combination with other parameters. For example, assume that as a result of acquiring the capability information of the printing apparatus 110, the printing apparatus 110 determines to be able to execute printing in the PDF format, and the PDF format is designated in the Validate-Job-Request. In this case as well, the verification result may be an error depending on a combination with other parameters such as the bordered/borderless setting and the number of copies. In this case, if the raster format is designated instead of the PDF format and print job verification is requested again, the verification result may indicate a normal state. An example of processing of controlling which of the terminal apparatus 100 and the printing apparatus 110 executes image rotation control, based on not only the previously acquired capability information of the printing apparatus 110 but also the verification result of the print job will be described with reference to FIG. 6.

Figure 6:
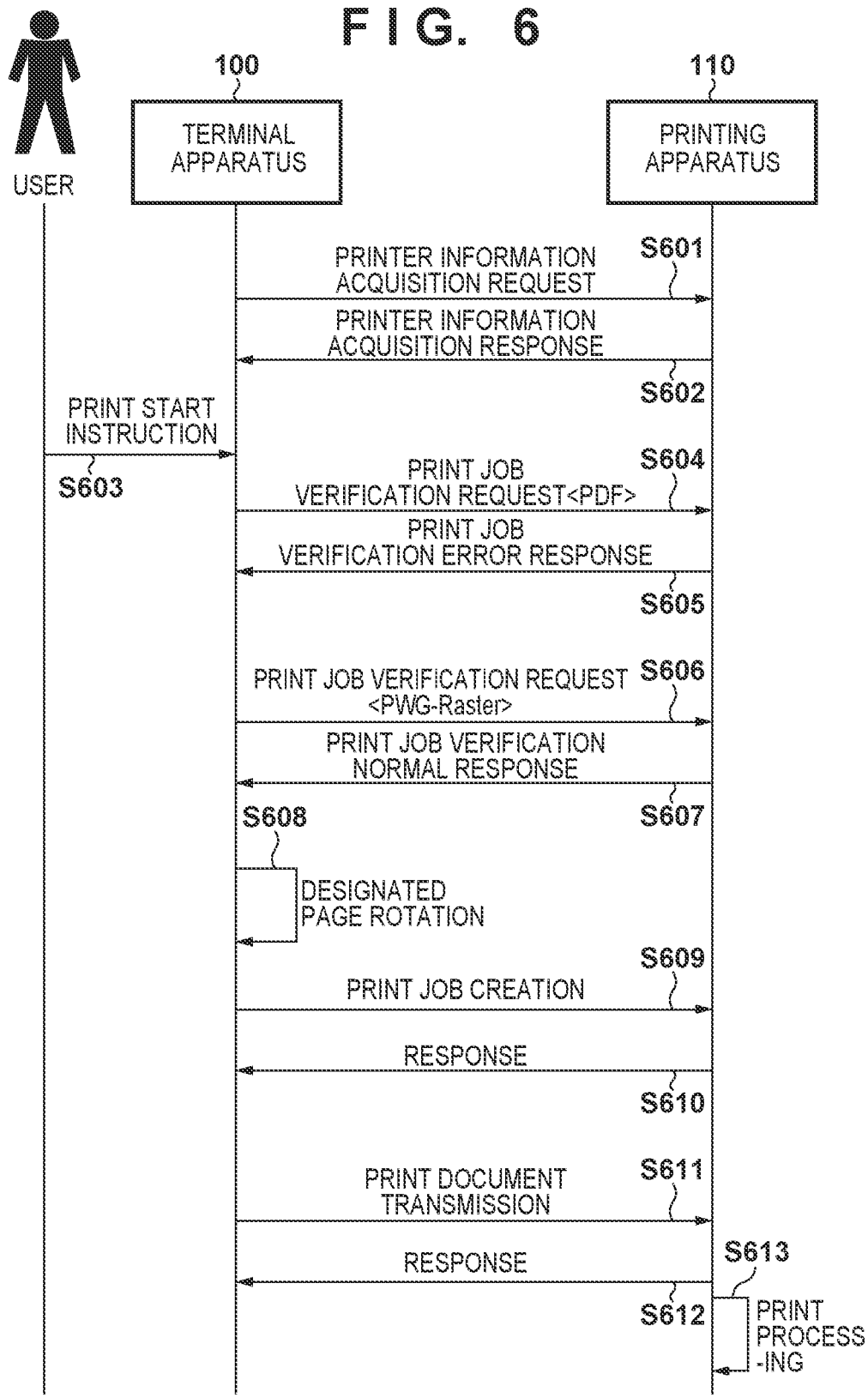
FIG. 6 is a sequence chart showing a communication sequence between the apparatuses of the printing system.

FIG. 6 is a sequence chart showing another example of the communication sequence between the apparatuses of the printing system according to this embodiment. In FIG. 6, the processing of the terminal apparatus 100 is executed by the CPU 101, and the processing of the printing apparatus 110 is executed by the CPU 111. The processing shown in FIG. 6 is started when, for example, the printing apparatus 110 connected to the network 130 is registered in the terminal apparatus 100. Note that in FIG. 6, the processing of the terminal apparatus 100 is executed by the standard driver.

S601 to S603 are the same as S501 to S503 of FIG. 5 and a description thereof will be omitted. In FIG. 6, assume that by executing the processing shown in FIG. 3 or 4, it is determined that the printing apparatus 110 can execute printing in the PDF format and the printing apparatus 110 executes image rotation control.

Upon accepting a print start instruction in S603, the terminal apparatus 100 transmits, in S604, a Validate-Job-Request as a print job verification request to the printing apparatus 110. In this example, application/pdf is designated in a document-format attribute.

Upon receiving the Validate-Job-Request, the printing apparatus 110 verifies the print setting value. Although the printing apparatus 110 can execute printing in the PDF format, it is determined that the printing apparatus 110 cannot execute printing as a result of a combination with other parameters designated in the Validate-Job-Request, such as the bordered/borderless setting and the number of copies. Therefore, in S605, the printing apparatus 110 transmits a Validate-Job-Response indicating an error as a verification result to the terminal apparatus 100.

Upon receiving the Validate-Job-Response indicating an error, the terminal apparatus 100 generates, in S606, a Validate-Job-Request in which the PWG-Raster format is designated in a document-format attribute. Then, the terminal apparatus 100 transmits the Validate-Job-Request to the printing apparatus 110. That is, in accordance with the previously acquired capability information of the printing apparatus 110, the printing apparatus 110 can execute printing in the PDF format but the verification result of the print job is an error. Therefore, the raster format is designated and verification of the print job is requested again.

Upon receiving the Validate-Job-Request, the printing apparatus 110 verifies the print setting value. Assume here that the printing apparatus 110 has a printing function of the PWG-Raster format and the verification result indicates a normal state. In S607, the printing apparatus 110 transmits, to the terminal apparatus 100, a Validate-Job-Response indicating a normal state as verification contents.

However, as described above, it is not easy for the printing apparatus 110 to execute rotation control for the image of the page transmitted on a band basis from the terminal apparatus 100. Therefore, in a case where the verification result indicates a normal state in accordance with designation of the raster format and the combination with other parameters, the terminal apparatus 100 executes image rotation control, as will be described below.

Upon receiving the Validate-Job-Response indicating success, the terminal apparatus 100 converts, in S608, the image data in the PDF format into image data in the PWG-Raster format. Then, the terminal apparatus 100 executes rotation control for the image of a specific page of the image data.

In S609, the terminal apparatus 100 creates a print job converted into the PWG-Raster format, and transmits it to the printing apparatus 110. More specifically, for example, the terminal apparatus 100 transmits a Create-Job-Request to the printing apparatus 110. Upon receiving the Create-Job-Request, the printing apparatus 110 generates a job object and transmits a Create-Job-Response to the terminal apparatus 100 in S610.

Upon receiving the Create-Job-Response, the terminal apparatus 100 transmits a document to the printing apparatus 110 in S611. More specifically, for example, the terminal apparatus 100 transmits, to the printing apparatus 110, a Send-Document-Request including the image data having undergone the image rotation control. Upon receiving the Send-Document-Request, the printing apparatus 110 transmits, in S612, a Send-Document-Response to the terminal apparatus 100. In S613, the printing apparatus 110 prints the document (image data) included in the Send-Document-Response.

In S613, the printing apparatus 110 controls to execute folding double-sided printing as part of finishing processing in accordance with the value of the imposition-template attribute of the finishings-col attribute of the Create-Job-Request. At this time, based on the format type of the document included in the Send-Document-Request, the printing apparatus 110 determines whether to execute image rotation control. Referring to FIG. 6, since the pwg-raster format is designated, the printing apparatus 110 determines not to execute image rotation control.

As described above, even if the capability information of the printing apparatus 110 is acquired in advance, it is possible to control the terminal apparatus 100 to execute image rotation control in accordance with the verification result of the print job. Note that the processing in S608 may be executed at a timing other than that shown in FIG. 6. For example, the processing in S608 may be executed after S610 and before the document is transmitted to the printing apparatus 110 in S611.

The processing of controlling which of the terminal apparatus 100 and the printing apparatus 110 executes image rotation control based on the capability information of the printing apparatus 110 acquired before the print start instruction has been explained with reference to FIG. 5. The processing of controlling which of the terminal apparatus 100 and the printing apparatus 110 executes image rotation control based on not only the previously acquired capability information of the printing apparatus 110 but also the verification result of the print job has been described with reference to FIG. 6. An example of processing of controlling which of the terminal apparatus 100 and the printing apparatus 110 executes image rotation control based on not only the previously acquired capability information of the printing apparatus 110 but also the verification result of the document will be described below with reference to FIG. 7.

Figure 7:
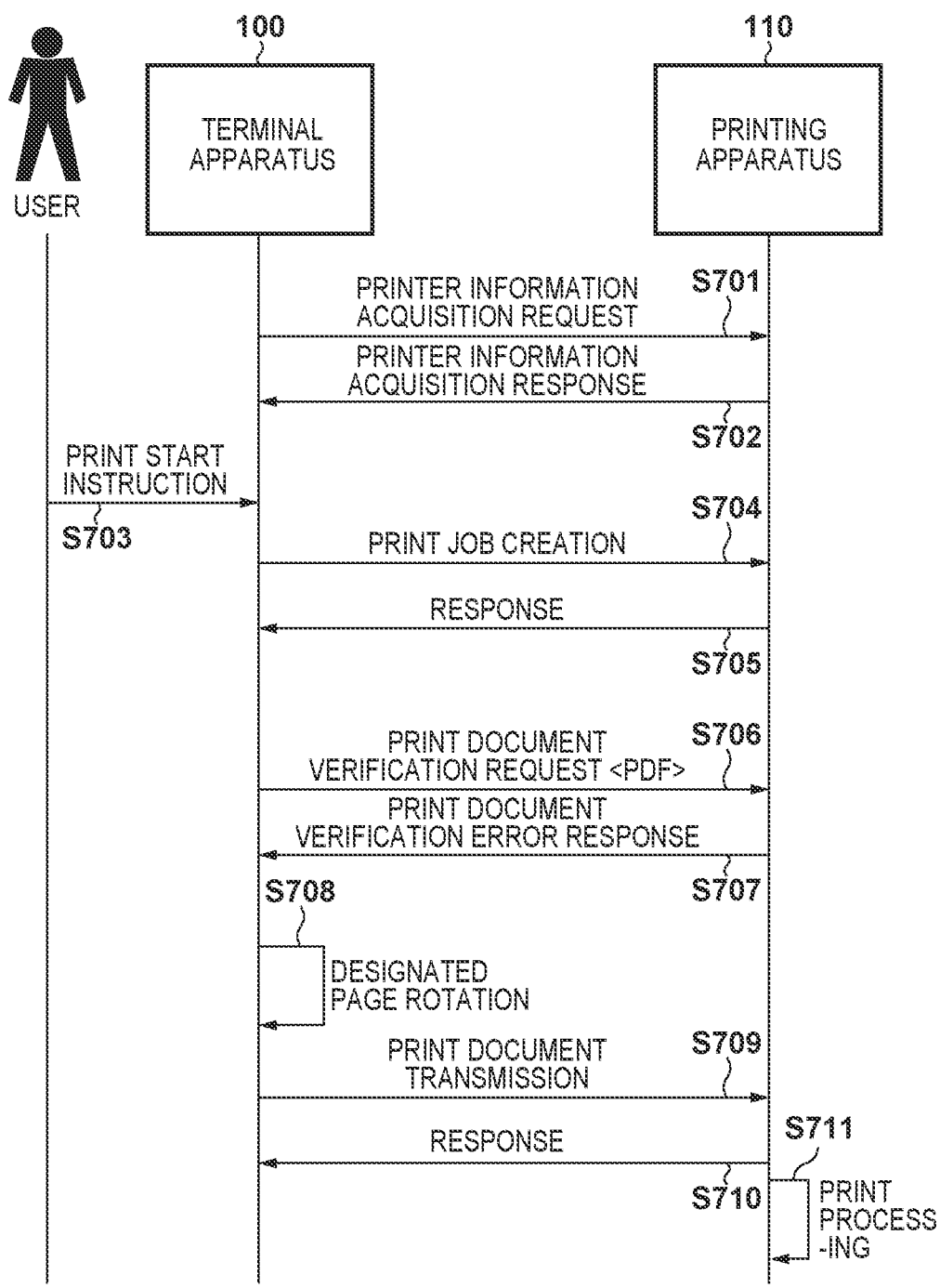
FIG. 7 is a sequence chart showing a communication sequence between the apparatuses of the printing system.

FIG. 7 is a sequence chart showing still another example of the communication sequence between the apparatuses of the printing system. In FIG. 7, the processing of the terminal apparatus 100 is executed by the CPU 101, and the processing of the printing apparatus 110 is executed by the CPU 111. The processing shown in FIG. 7 is started when, for example, the printing apparatus 110 connected to the network 130 is registered in the terminal apparatus 100. Note that in FIG. 7, the processing of the terminal apparatus 100 is executed by the standard driver.

S701 to S703 are the same as S501 to S503 of FIG. 5 and a description thereof will be omitted. In FIG. 7, assume that by executing the processing shown in FIG. 3 or 4, it is determined that the printing apparatus 110 can execute printing in the PDF format and the printing apparatus 110 executes image rotation control.

Upon accepting a print start instruction in S703, the terminal apparatus 100 creates a print job and transmits it to the printing apparatus 110 in S704. More specifically, for example, the terminal apparatus 100 transmits a Create-Job-Request to the printing apparatus 110. In the document-format attribute of the Create-Job-Request, application/pdf is designated. Upon receiving the Create-Job-Request, the printing apparatus 110 generates a job object and transmits a Create-Job-Response to the terminal apparatus 100 in S705.

Upon receiving the Create-Job-Response, the terminal apparatus 100 transmits, to the printing apparatus 110, a Validate-Document-Request for requesting verification of the document in S706. Upon receiving the Validate-Document-Request, the printing apparatus 110 verifies the document data. FIG. 7 assumes that the analysis result of the document data in the PDF format indicates a failure. Examples of a case where the analysis result indicates a failure are a case where the printing apparatus 110 does not support the version of the PDF file and a case where the PDF file is unauthorized. In S707, the printing apparatus 110 transmits a Validate-Document-Response indicating an error as the verification result to the terminal apparatus 100.

Upon receiving the Validate-Document-Response indicating an error, the terminal apparatus 100 converts the image data in the PDF format into image data in the PWG-Raster format in S708. In S708, the terminal apparatus 100 executes rotation control for the image of a specific page of the image data.

In S709, the terminal apparatus 100 transmits the document to the printing apparatus 110. More specifically, for example, the terminal apparatus 100 transmits, to the printing apparatus 110, a Send-Document-Request including the image data having undergone the image rotation control. Upon receiving the Send-Document-Request, the printing apparatus 110 transmits a Send-Document-Response to the terminal apparatus 100 in S710. In S711, the printing apparatus 110 prints the document (image data) included in the Send-Document-Request.

In S711, the printing apparatus 110 controls to execute folding double-sided printing as part of finishing processing in accordance with the value of the imposition-template attribute of the finishings-col attribute of the Create-Job-Request. At this time, based on the format type of the document included in the Send-Document-Request, the printing apparatus 110 determines whether to execute image rotation control. Referring to FIG. 7, since the pwg-raster format is designated, the printing apparatus 110 determines not to execute image rotation control.

As described above, even if the capability information of the printing apparatus 110 is acquired in advance, it is possible to control the terminal apparatus 100 to execute image rotation control in accordance with the verification result of the document.

In the case where the print result is as shown in FIGS. 2A and 2B, the operations of the terminal apparatus 100 and the printing apparatus 110 have been explained above. If the terminal apparatus 100 executes image rotation control, it rotates an odd-numbered page by 180° in a case where the image data is transmitted in ascending order, and rotates an even-numbered page by 180° in a case where the image data is transmitted in descending order. Alternatively, if the printing apparatus 110 executes image rotation control, it executes rotation control for the image of the page that is closer to the leading edge of the roll paper and is to be printed first.

FIGS. 8A and 8B are views showing another example of the print result of printing by the printing apparatus 110. FIG. 8A shows an example of a result of printing the image data (images A and B) transmitted from the terminal apparatus 100 on the roll paper by the printing apparatus 110. As shown in FIG. 8B, the user mountain-folds the printed roll paper at an intermediate position as the boundary between the images A and B. As a result, as shown in the upper portion of FIG. 8B, the image A is displayed on the front paper surface. If the paper is reversed, the image B is displayed on the back paper surface, as shown in the lower portion of FIG. 8B. If the paper in the state shown in FIG. 8B is hung from a ceiling or the like, the images A and B can be visually perceived from both the sides.

In the case shown in FIG. 8A, the terminal apparatus 100 and the printing apparatus 110 determine true/false of the following determination expression based on the image size of each of the images A and B and the size of the roll paper, and executes rotation control of the corresponding image based on the determination result.

width of image>width of roll paper

As shown in FIG. 8A, since a width 802 of each of the images A and B is longer than a width 801 of the roll paper, the above determination expression is true. In this case, when executing folding double-sided printing, rotation control is executed for the image A, that is closer to the leading edge of the roll paper and is to be printed first, to rotate the image A rightward by 90° from the correct position. Then, the image A having undergone the rotation control is laid out in a print region on one side of the central axis corresponding to the conveyance direction of the roll paper. For the image B to be subsequently printed, rotation control is executed to rotate the image B leftward by 90° from the correct position. Then, the image B having undergone the rotation control is laid out in a print region on the other side of the central axis. That is, as shown in FIG. 8A, when the images A and B of the image data to undergo folding double-sided printing are laid out in the print regions of the roll paper, the images are laid out so that the upper ends of the two images face each other (the rotation directions are opposite). Note that the images A and B are used for the sake of description but the images A and B may be processed as two pages laid out on the print medium of the roll paper.

Figure 12:
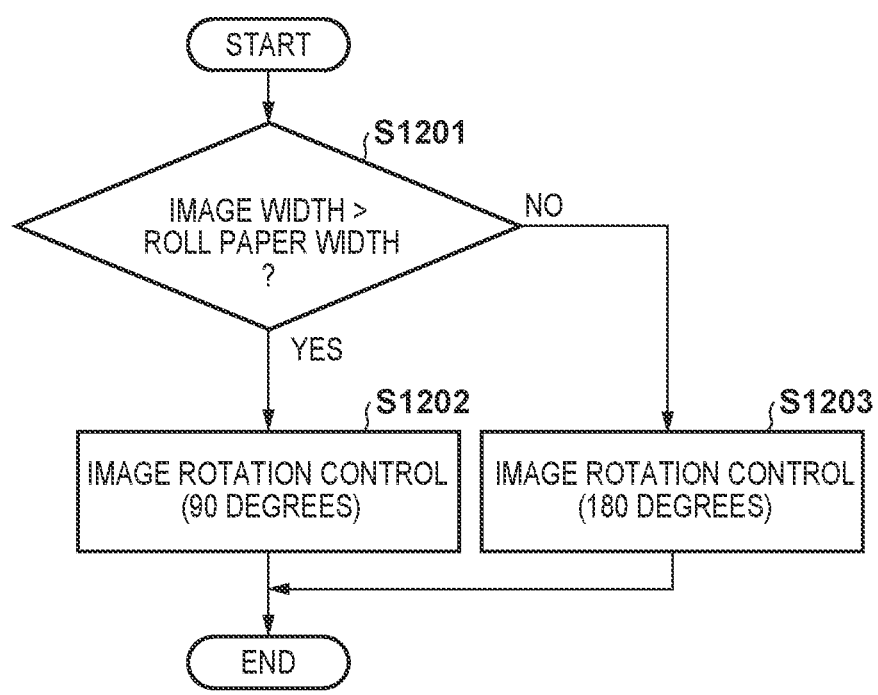
FIG. 12 is a flowchart illustrating layout control processing.

In a case where the printing apparatus 110 executes image rotation control, the printing apparatus 110 executes rotation control of the corresponding image in print processing in accordance with the determination result of the above determination expression based on the value of the IPP attribute of the Send-Document-Request or the like. That is, the printing apparatus 110 determines in step S1201 of FIG. 12 whether the result of the determination expression is true or false. That is, it is determined whether the condition that the image width is longer than the roll paper width is satisfied or the condition that the image width is equal to or shorter than the roll paper width is satisfied. Note that the printing apparatus 110 may acquire information of the image width from the value of the IPP attribute of the Create-Job-Request, the Send-Document-Request, or the like. If true is determined in step S1201, the printing apparatus 110 executes, in step S1202, rotation control to rotate the image of each page by 90°. On the other hand, if false is determined, the printing apparatus 110 executes, in step S1203, rotation control to rotate the image of a specific page by 180°, as described with reference to FIGS. 2A and 2B.

In a case where the terminal apparatus 100 executes image rotation control, the terminal apparatus 100 executes image rotation control in accordance with the above determination expression based on the value of the attribute included in the Get-Printer-Attributes response. That is, the terminal apparatus 100 determines in step S1201 of FIG. 12 whether the result of the above determination expression is true or false. That is, it is determined whether the condition that the image width is longer than the roll paper width is satisfied or the condition that the image width is equal to or shorter than the roll paper width is satisfied. Note that the terminal apparatus 100 may acquire information of the roll paper width from the value of the IPP attribute of the Get-Printer-Attributes response. If true is determined in step S1201, the terminal apparatus 100 executes, in step S1202, rotation control to rotate the image of each page by 90°. At this time, the transmission order of the plurality of pages to the printing apparatus 110 is considered. For example, if it is set to transmit the pages in ascending order, rotation control is executed to rotate the image of an odd-numbered page (the first page) rightward by 90° and rotation control is executed to rotate the image of an even-numbered page (the second page) leftward by 90°. Then, the terminal apparatus 100 lays out the two images in the print regions so that the upper ends of the two images face each other (the rotation directions are opposite). If it is set to transmit the pages in descending order, rotation control is executed to rotate the image of an even-numbered page (the second page) rightward by 90° and rotation control is executed to rotate the image of an odd-numbered page (the first page) leftward by 90°. Then, the terminal apparatus 100 lays out the two images in the print regions so that the upper ends of the two images face each other (the rotation directions are opposite). On the other hand, if false is determined, the terminal apparatus 100 executes, in step S1203, rotation control to rotate the image of a specific page by 180°, as described with reference to FIGS. 2A and 2B.

Note that regardless of the format of the image data and the rotation angle of the image, the terminal apparatus 100 transmits, to the printing apparatus 110, a job designated as folding double-sided printing. More specifically, banner-folding is designated in the imposition-template attribute at the time of transmitting the Create-Job-Request.

As described above, according to this embodiment, it is possible to appropriately control which of the terminal apparatus 100 and the printing apparatus 110 executes image rotation control based on the capability information of the printing apparatus 110.

Note that the form in which the program for executing the control of this embodiment is the standard driver using IPP has been described above, but some embodiments are not limited to this. This program may be a standard driver using a standard protocol other than IPP. This program may be a printer driver provided by the vendor of the printing apparatus 110. This program may be a printer driver using a proprietary protocol of the vendor, which is not a standard protocol.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2022-115053, which was filed on Jul. 19, 2022 and which is hereby incorporated by reference herein in its entirety.

What is claimed is:

1. An information processing apparatus comprising:
at least one memory and at least one processor, wherein the at least one memory and the at least one processor are configured to:
acquire information indicating capability of a printing apparatus; and
perform rotation processing for a print target for each layout region on a print medium, and perform control to transmit the print target to the printing apparatus without rotating an image of the print target to be laid out in a first layout region in a case where the capability of the printing apparatus satisfies a predetermined condition based on the acquired information, and transmit the print target to the printing apparatus by rotating the image of the print target to be laid out in the first layout region in a case where the capability of the printing apparatus does not satisfy the predetermined condition based on the acquired information.

2. The information processing apparatus according to claim 1, wherein the at least one memory and the at least one processor are configured to transmit the print target to the printing apparatus without rotating an image of the print target to be laid out in a second layout region regardless of whether the capability of the printing apparatus satisfies the predetermined condition.

3. The information processing apparatus according to claim 2, wherein in a case where a printed product on which the print target is printed by the printing apparatus is mountain-folded at a line between the first layout region and the second layout region, the image laid out in the first layout region and the image laid out in the second layout region have the same up-down direction.

4. The information processing apparatus according to claim 2, wherein in a printed product on which the print target is printed by the printing apparatus, upper sides of the image laid out in the first layout region and the image laid out in the second layout region face each other.

5. The information processing apparatus according to claim 2, wherein the first layout region corresponds to a region of the print target, that is printed before the second layout region by the printing apparatus.

6. The information processing apparatus according to claim 2, wherein
in a case where a plurality of pages included in the print target are printed in ascending order, the first layout region is a layout region corresponding to an odd-numbered page of the plurality of pages, and the second layout region is a layout region corresponding to an even-numbered page of the plurality of pages, and
in a case where the plurality of pages are printed in descending order, the first layout region is a layout region corresponding to an even-numbered page of the plurality of pages, and the second layout region is a layout region corresponding to an odd-numbered page of the plurality of pages.

7. The information processing apparatus according to claim 1, wherein in a case where the capability of the printing apparatus does not satisfy the predetermined condition, the at least one memory and the at least one processor are configured to perform control to transmit the print target to the printing apparatus by rotating, by 180°, the image of the print target to be laid out in the first layout region.

8. The information processing apparatus according to claim 1, wherein the print target is a target of banner printing.

9. The information processing apparatus according to claim 1, wherein the print target is printed on roll paper.

10. The information processing apparatus according to claim 1, wherein the predetermined condition includes a condition that the printing apparatus is able to process a print target in a predetermined format.

11. The information processing apparatus according to claim 10, wherein the predetermined format is a PDF format.

12. The information processing apparatus according to claim 10, wherein the predetermined condition includes a condition that a size of the image of the print target to be laid out in the first layout region is not larger than a data size processible by the printing apparatus.

13. The information processing apparatus according to claim 10, wherein in a case where the capability of the printing apparatus does not satisfy the predetermined condition, the at least one memory and the at least one processor are configured to transmit the print target to the printing apparatus by converting the image of the print target to be laid out in the first layout region into a second format different from the predetermined format.

14. The information processing apparatus according to claim 13, wherein the second format is a raster format.

15. The information processing apparatus according to claim 1, wherein in a case where the capability of the printing apparatus satisfies the predetermined condition, the image of the print target to be laid out in the first layout region is rotated by the printing apparatus.

16. The information processing apparatus according to claim 1, wherein in a case where a response of a verification request to the printing apparatus is information indicating that the printing apparatus is not able to rotate the image of the print target to be laid out in the first layout region although the acquired information indicates that the capability of the printing apparatus satisfies the predetermined condition, the at least one memory and the at least one processor are configured to perform control to transmit the print target to the printing apparatus by rotating the image of the print target to be laid out in the first layout region.

17. The information processing apparatus according to claim 1, wherein the at least one memory and the at least one processor are configured to acquire the information indicating the capability of the printing apparatus by Internet Printing Protocol (IPP).

18. The information processing apparatus according to claim 1, wherein the at least one memory and the at least one processor are configured to implement the control to transmit the print target to the printing apparatus by executing a program of a standard driver of an OS.

19. The information processing apparatus according to claim 1, wherein in a case where the print target in which each of a first image to be laid out in the first layout region and a second image to be laid out in the second layout region has a width larger than a width of the print medium is printed and the capability of the printing apparatus does not satisfy the predetermined condition, the at least one memory and the at least one processor are configured to perform control to transmit the print target to the printing apparatus by rotating the first image and the second image in different directions by 90°, respectively.

20. The information processing apparatus according to claim 1, wherein the at least one memory and the at least one processor are configured to:

transmit the print target in association with first information to the printing apparatus without rotating the image of the print target to be laid out in the first layout region in a case where the capability of the printing apparatus satisfies the predetermined condition, and transmit the print target in association with second information to the printing apparatus by rotating the image of the print target to be laid out in the first layout region in a case where the capability of the printing apparatus does not satisfy the predetermined condition.

21. A system comprising an information processing apparatus and a printing apparatus, the information processing apparatus including at least one memory and at least one processor, wherein the at least one memory and the at least one processor of the information processing apparatus are configured to:

acquire information indicating capability of the printing apparatus; and perform rotation processing for a print target for each layout region on a print medium, and to perform control to transmit the print target in association with first information to the printing apparatus without rotating an image of the print target to be laid out in a first layout region in a case where the capability of the printing apparatus satisfies a predetermined condition based on the acquired information, and transmit the print target in association with second information to the printing apparatus by rotating the image of the print target to be laid out in the first layout region in a case where the capability of the printing apparatus does not satisfy the predetermined condition based on the acquired information, and the printing apparatus including at least one memory and at least one processor, wherein the at least one memory and the at least one processor of the printing apparatus are configured to:

transmit the information indicating the capability of the printing apparatus to the information processing apparatus; and perform processing to execute printing by performing processing of rotating the image of the print target to be laid out in the first layout region in a case where the print target is transmitted from the information processing apparatus and is associated with the first information, and execute printing without performing the processing of rotating the image of the print target to be laid out in the first layout region in a case where the print target is transmitted from the information processing apparatus and is associated with the second information.

22. A printing apparatus which is able to communicate with an information processing apparatus including at least one memory and at least one processor configured to acquire information indicating capability of the printing apparatus, to perform rotation processing for a print target for each layout region on a print medium, and to control to transmit the print target in association with first information to the printing apparatus without rotating an image of the print target to be laid out in a first layout region in a case where the capability of the printing apparatus satisfies a predetermined condition based on the acquired information, and transmit the print target in association with second information to the printing apparatus by rotating the image of the print target to be laid out in the first layout region in a case where the capability of the printing apparatus does not satisfy the predetermined condition based on the acquired information, the printing apparatus comprising:

at least one memory and at least one processor, wherein the at least one memory and at least one processor are configured to:

transmit the information indicating the capability of the printing apparatus to the information processing apparatus; and perform processing to execute printing by performing processing of rotating the image of the print target to be laid out in the first layout region in a case where the print target is transmitted from the information processing apparatus and is associated with the first information, and execute printing without performing the processing of rotating the image of the print target to be laid out in the first layout region in a case where the print target is transmitted from the information processing apparatus and is associated with the second information.

23. A control method comprising:

acquiring information indicating capability of a printing apparatus; and controlling to perform rotation processing for a print target for each layout region on a print medium, wherein in the controlling, control is executed to transmit the print target to the printing apparatus without rotating an image of the print target to be laid out in a first layout region in a case where the capability of the printing apparatus satisfies a predetermined condition based on the acquired information, and transmit the print target to the printing apparatus by rotating the image of the print target to be laid out in the first layout region in a case where the capability of the printing apparatus does not satisfy the predetermined condition based on the acquired information.

24. A control method executed in a system including an information processing apparatus and a printing apparatus, the method comprising:

in the information processing apparatus, acquiring information indicating capability of the printing apparatus; and controlling to perform rotation processing for a print target for each layout region on a print medium, wherein in the controlling, control is executed to transmit the print target in association with first information to the printing apparatus without rotating an image of the print target to be laid out in a first layout region in a case where the capability of the printing apparatus satisfies a predetermined condition based on the acquired information, and transmit the print target in association with second information to the printing apparatus by rotating the image of the print target to be laid out in the first layout region in a case where the capability of the printing apparatus does not satisfy the predetermined condition based on the acquired information; and in the printing apparatus, transmitting the information indicating the capability of the printing apparatus to the information processing apparatus; and performing processing to execute printing by performing processing of rotating the image of the print target to be laid out in the first layout region in a case where the print target is transmitted from the information processing apparatus and is associated with the first information, and execute printing without performing the processing of rotating the image of the print target to be laid out in the first layout region in a case where the print target is transmitted from the information processing apparatus and is associated with the second information.

25. A control method executed in a printing apparatus which is able to communicate with an information processing apparatus including an at least one memory and at least one processor configured to acquire information indicating capability of the printing apparatus, and perform rotation processing for a print target for each layout region on a print medium, and to control to transmit the print target in association with first information to the printing apparatus without rotating an image of the print target to be laid out in a first layout region in a case where the capability of the printing apparatus satisfies a predetermined condition based on the acquired information, and transmit the print target in association with second information to the printing apparatus by rotating the image of the print target to be laid out in the first layout region in a case where the capability of the printing apparatus does not satisfy the predetermined condition based on the acquired information, the method comprising:
transmitting the information indicating the capability of the printing apparatus to the information processing apparatus; and
performing processing to execute printing by performing processing of rotating the image of the print target to be laid out in the first layout region in a case where the print target is transmitted from the information processing apparatus and is associated with the first information, and execute printing without performing the processing of rotating the image of the print target to be laid out in the first layout region in a case where the print target is transmitted from the information processing apparatus and is associated with the second information.

26. A non-transitory computer-readable storage medium storing computer-executable instructions that, when executed by a computer, cause the computer to:
acquire information indicating capability of a printing apparatus; and
control to perform rotation processing for a print target for each layout region on a print medium, wherein in the control, control is executed to transmit the print target to the printing apparatus without rotating an image of the print target to be laid out in a first layout region in a case where the capability of the printing apparatus satisfies a predetermined condition based on the acquired information, and transmit the print target to the printing apparatus by rotating the image of the print target to be laid out in the first layout region in a case where the capability of the printing apparatus does not satisfy the predetermined condition based on the acquired information.

27. One or more non-transitory computer-readable storage media storing computer-executable instructions that, when executed by an information processing apparatus and a printing apparatus, cause the information processing apparatus and the printing apparatus to:
in the information processing apparatus,
acquire information indicating capability of the printing apparatus; and
control to perform rotation processing for a print target for each layout region on a print medium, wherein in the control, control is executed to transmit the print target in association with first information to the printing apparatus without rotating an image of the print target to be laid out in a first layout region in a case where the capability of the printing apparatus satisfies a predetermined condition based on the acquired information, and transmit the print target in association with second information to the printing apparatus by rotating the image of the print target to be laid out in the first layout region in a case where the capability of the printing apparatus does not satisfy the predetermined condition based on the acquired information; and in the printing apparatus,
transmit the information indicating the capability of the printing apparatus to the information processing apparatus; and
perform processing to execute printing by performing processing of rotating the image of the print target to be laid out in the first layout region in a case where the print target is transmitted from the information processing apparatus and is associated with the first information, and execute printing without performing the processing of rotating the image of the print target to be laid out in the first layout region in a case where the print target is transmitted from the information processing apparatus and is associated with the second information.

28. One or more non-transitory computer-readable storage media storing computer-executable instructions that, when executed by one or more computers, cause the one or more computers to:
transmit information indicating capability of a printing apparatus to an information processing apparatus including at least one memory and at least one processor configured to acquire the information indicating the capability of the printing apparatus;
control to perform rotation processing for a print target for each layout region on a print medium, and control to transmit the print target in association with first information to the printing apparatus without rotating an image of the print target to be laid out in a first layout region in a case where the capability of the printing apparatus satisfies a predetermined condition based on the acquired information, and transmit the print target in association with second information to the printing apparatus by rotating the image of the print target to be laid out in the first layout region in a case where the capability of the printing apparatus does not satisfy the predetermined condition based on the acquired information; and
perform processing to execute printing by performing processing of rotating the image of the print target to be laid out in the first layout region in a case where the print target is transmitted from the information processing apparatus and is associated with the first information, and execute printing without performing the processing of rotating the image of the print target to be laid out in the first layout region in a case where the print target is transmitted from the information processing apparatus and is associated with the second information.

29. The information processing apparatus according to claim 1, wherein the acquired information indicates capability of the printing apparatus for printing on roll paper, and
wherein the each layout region includes plural layout regions to be printed on one surface of the roll paper.

30. The system according to claim 21, wherein the acquired information indicates capability of the printing apparatus for printing on roll paper, and
   wherein the each layout region includes plural layout regions to be printed on one surface of the roll paper.

31. The printing apparatus according to claim 22, wherein the acquired information indicates capability of the printing apparatus for printing on roll paper, and
   wherein the each layout region includes plural layout regions to be printed on one surface of the roll paper.

32. The control method according to claim 23, wherein the acquired information indicates capability of the printing apparatus for printing on roll paper, and
   wherein the each layout region includes plural layout regions to be printed on one surface of the roll paper.

33. The control method according to claim 24, wherein the acquired information indicates capability of the printing apparatus for printing on roll paper, and
   wherein the each layout region includes plural layout regions to be printed on one surface of the roll paper.

34. The control method according to claim 25, wherein the acquired information indicates capability of the printing apparatus for printing on roll paper, and
   wherein the each layout region includes plural layout regions to be printed on one surface of the roll paper.

35. The non-transitory computer-readable storage medium according to claim 26, wherein the acquired information indicates capability of the printing apparatus for printing on roll paper, and
   wherein the each layout region includes plural layout regions to be printed on one surface of the roll paper.

36. The one or more non-transitory computer-readable storage media according to claim 27, wherein the acquired information indicates capability of the printing apparatus for printing on roll paper, and
   wherein the each layout region includes plural layout regions to be printed on one surface of the roll paper.

37. The one or more non-transitory computer-readable storage media according to claim 28, wherein the acquired information indicates capability of the printing apparatus for printing on roll paper, and
   wherein the each layout region includes plural layout regions to be printed on one surface of the roll paper.

* * * * *